(12) United States Patent
Raman et al.

(10) Patent No.: US 7,627,042 B2
(45) Date of Patent: Dec. 1, 2009

(54) SYSTEM, METHOD, AND APPARATUS FOR ERROR RECOVERY IN CODED VIDEO SIGNALS

(75) Inventors: Arvind Raman, Bangalore (IN); Murali Babu Muthukrishnan, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 709 days.

(21) Appl. No.: 10/746,542

(22) Filed: Dec. 24, 2003

(65) Prior Publication Data

US 2004/0145677 A1    Jul. 29, 2004

(30) Foreign Application Priority Data

Jan. 23, 2003    (IN) .............................. 63/MAS/2003

(51) Int. Cl.
*H04N 7/64* (2006.01)
*H04N 9/888* (2006.01)
*H04N 7/68* (2006.01)
*H04N 7/035* (2006.01)

(52) U.S. Cl. .................................. 375/240.27
(58) Field of Classification Search ............ 375/240.27; 386/95
See application file for complete search history.

(56) References Cited

U.S. PATENT DOCUMENTS

| | | | |
|---|---|---|---|
| 5,497,404 A * | 3/1996 | Grover et al. | 375/240.27 |
| 5,583,650 A * | 12/1996 | Lane et al. | 386/81 |
| 6,040,879 A * | 3/2000 | Park | 375/240.27 |
| 6,421,386 B1 * | 7/2002 | Chung et al. | 375/240.24 |
| 6,445,742 B1 * | 9/2002 | Yoo et al. | 375/240.27 |
| 6,446,624 B1 * | 9/2002 | Chu | 126/299 R |
| 6,466,624 B1 * | 10/2002 | Fogg | 375/240.27 |
| 6,498,865 B1 * | 12/2002 | Brailean et al. | 382/239 |
| 6,571,361 B1 * | 5/2003 | Kikuchi et al. | 714/701 |
| 6,665,345 B1 * | 12/2003 | Sekiguchi et al. | 375/240.25 |
| 6,728,318 B2 * | 4/2004 | Lin et al. | 375/240.27 |
| 7,039,837 B2 * | 5/2006 | Martini et al. | 714/52 |
| 2001/0012444 A1 * | 8/2001 | Ito et al. | 386/111 |
| 2001/0040926 A1 * | 11/2001 | Hannuksela et al. | 375/240.27 |
| 2002/0122493 A1 * | 9/2002 | Lin | 375/240.27 |
| 2003/0014705 A1 * | 1/2003 | Suzuki et al. | 714/748 |
| 2004/0047424 A1 * | 3/2004 | Ramaswamy et al. | 375/240.27 |
| 2004/0071217 A1 * | 4/2004 | Lin | 375/240.25 |
| 2006/0251176 A1 * | 11/2006 | Hatabu et al. | 375/240.27 |
| 2007/0076800 A1 * | 4/2007 | Shukla et al. | 375/240.25 |

OTHER PUBLICATIONS

Li, W. et al. "MPEG-4 Video Verification Model version 18.0", ISO/IEC JTC1/SC29/WG11 N3908, Jan. 2001, pp. 14-15, 54, 72-77, 105-113, 358-363.*

* cited by examiner

*Primary Examiner*—David Czekaj
*Assistant Examiner*—David N Werner
(74) *Attorney, Agent, or Firm*—Prakash Nama; Global IP services, PLLC

(57) ABSTRACT

Efficient techniques are provided to detect and correct channel errors found in an encoded video signal. In one example embodiment, header and global information in a video frame is analyzed to detect channel errors in the video frame. The video frame is then corrected for detected channel errors by isolating the detected channel errors to a few macroblocks in the video frame to reduce data loss and improve video quality.

7 Claims, 7 Drawing Sheets

SYSTEM, METHOD, AND APPARATUS FOR ERROR RECOVERY IN CODED VIDEO SIGNALS

This application claims priority to Indian Provisional Application No. 63/MAS/2003 filed on Jan. 23, 2003 which is incorporated herein by reference.

TECHNICAL FIELD OF THE INVENTION

The present invention relates generally to digital video signal processing and more particularly to error detection and recovery within a Moving Picture Experts Group (MPEG) decoder system.

BACKGROUND OF THE INVENTION

Transmission of digitized video signals can provide video images of a much higher quality than the transmission of analog signals. However, the available frequency bandwidth of a conventional transmission channel is limited. In order to reduce bandwidth requirement and the amount of data to be sent during transmission, the voluminous digital video signal is compressed via encoding, without a considerable loss in visual quality.

Digital video encoding has achieved tremendous progress over the last decade. Various algorithms have been developed to achieve a very good quality video encoding at a given bandwidth using a combination of block transforms and inter frame motion estimation. These algorithms developed by the ISO MPEG committee, namely MPEG-1 (ISO/IEC 11172-2), MPEG-2 (ISO/IEC13818-2), and MPEG-4 (ISO/IEC 14496-2) standards have become very popular over the years and have had greater acceptability because of the standardization in the encoding and the decoding methods.

MPEG-4 video compression removes spatial redundancy by employing discrete cosine transformation (or wavelet transform), quantization, zigzag scanning, and variable-length coding. Temporal redundancy is also removed through a process of inter-frame motion estimation and predictive coding. The entire frame to be coded is divided into squares of 8×8 blocks and/or 16×16 macroblocks. The MPEG-4 coded frames may be either intra-coded, forward only predictive coded, or bidirectional-predictive coded. An intra-coded frame is coded using only the spatial compression techniques, while a forward only predicted frame is coded using macroblocks selected from a single reference frame. A given bidirectional-predictive frame is encoded using macroblocks generated by interpolating between a pair of macroblocks selected from two reference frames, one preceding and the other following the bidirectional-predictive frame.

A significant problem with compressing video signals for transmission over limited bandwidth transmission paths is that the data becomes more susceptible to the presence of transmission errors. The nature of the transmission path will be such that the channel errors usually cannot be prevented, which can lead to undesirable quality degradation. Since MPEG uses predictive coding of frames the quality degradation due to channel errors can propagate from one frame to another. In order to avoid these undesirable video quality degradation, channel error recovery and correction is generally applied to the decoded video.

One conventional method for detecting errors comprises including error correction codes as an overhead in the transmitted signal. Such methods prohibit using standard encoders and decoders. Other conventional techniques have primitive error recovery techniques where the decoding process is re-synchronized to start a predetermined resynchronization point and the entire video packet that was in error is assumed to be damaged. These resynchronization points may be several macroblocks apart and the entire set of macroblocks lying between the two synchronization points is discarded to avoid any quality degradation. In addition, this can have an undesirable effect on the next frame due to the predictive coding applied as stated above. Hence the next frame, which uses the previous damaged frame's macroblocks, can also have severe quality degradation despite the frame being received without errors. This can result in excessive data loss, leading to unacceptable video quality, especially when a bit error rate is high.

The conventional systems lack efficient and robust error localization and concealment techniques. In addition, conventional systems do not take advantage of error isolation toolsets like resynchronization markers, data partitioning, reversible variable length codes, and so on provided in MPEG-4 to isolate errors in the video packets to a few damaged blocks to achieve superior error localization and recovery.

SUMMARY OF THE INVENTION

The present invention provides error detection and recovery techniques for channel errors, encountered during transmission, found at a decoder end while decoding compressed video signals. In one example embodiment, this is accomplished by analyzing data header and global information in a coded video frame to detect and correct for any channel errors found in the received coded video signal by isolating the found channel errors to a few macroblocks in the video frame.

DETAILED DESCRIPTION OF THE INVENTION

The present subject matter provides simple but robust error detection and recovery techniques for channel errors, encountered during transmission, found at decoder end while decoding compressed video signals. These techniques are especially suitable for use in MPEG-4 coded video frames. In one example embodiment, this is accomplished by analyzing boundaries between current, preceding, and subsequent video packets to detect and correct for any channel errors found in the received coded video signal by limiting the found channel errors to substantially few macroblocks in the coded video signal.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "coder" and "encoder" are used interchangeably throughout the document. Also, the terms "frame", "video frame", and "coded frame" are used interchangeably throughout the document. In addition, the terms "error" and "channel error" are used interchangeably throughout the document.

Figure 1:
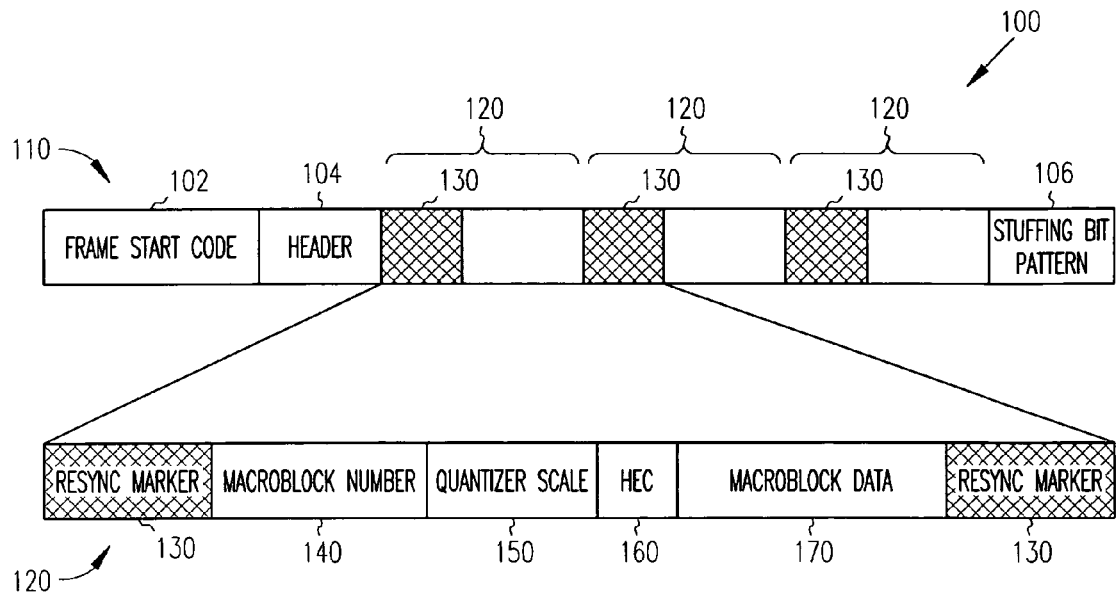
FIG. 1 is a block diagram illustrating an MPEG-4 error resilient video frame including one or more video packets.

FIG. 1 is a block diagram 100 illustrating an MPEG-4 error resilient video frame 110 including one or more video packets 120. An encoded video signal is generally transmitted as a sequence of such video frames. An MPEG-4 coded video frame 110, such as the one shown in FIG. 1, is generally divided into 8×8 or 16×16 macroblocks. As described earlier, an MPEG-4 coded video frame may be either intra-coded or inter-coded. As shown in FIG. 1, a typical MPEG-4 coded video frame 110 contains a frame start code 102, a header 104, a sequence of one or more video packets 120, and a stuffing bit pattern 106 following the one or more video packets 120. In addition, MPEG-4 provides error isolation toolsets in video frames, such as multiple video packets, reversible variable length codes (RVLC), the header extension codes (HEC) to isolate errors in the video packets 120. However, using such error isolation toolsets is optional and not mandatory to get a compliant video stream. If used, these toolsets can improve error resilience of a coded video bit stream and hence can conceal errors.

Generally, all transform coefficients and the motion vector data are coded using variable length codes. An error in one of the codes can give rise to an error in the decoding of coefficients occurring later in the stream. Therefore, very efficient error localization is required to confine the error to just a few macroblocks. An MPEG-4 error resilience toolset contains certain inbuilt features, such as the frame start code 102, the header 104 and resync markers 130, which enable error recovery. In order to confine error, each video frame 110 is divided into one or more video packets 120 including groups of macroblocks from the video frame 110 as described-above.

As shown in FIG. 1, each MPEG-4 error resilient video packet 100 includes an error resilient tool, such as the resync marker 130 at the beginning of each video packet 120. Each current video packet 120 is independent of the preceding video packets 120 of a video frame 110, i.e., the macroblocks in the current video packet 120 do not use any of the parameters that have been sent as part of the preceding video packets 120 in the video frame 110. Therefore, any error in the current video packet 120 is confined to just the current video packet 120 and not the preceding video packets 120. In addition to resync marker 130, each video packet 120 also includes a macroblock number 140 following the resync marker 130, a quantizer scale 150 following the macroblock number 140, a header extension code (HEC) 160 following the quantizer scale 150, and macroblock data 170 following the HEC 160. The HEC is optionally sent and it contains some header information like modulo time base, vop time increment, and fcode and so on. The macroblock number 140 indicates a macroblock number of a first macroblock in the video packet 120. Generally, the macroblock number count starts by assigning a zero to the top left edge of the video frame 120 in a raster scan order.

Figure 2:
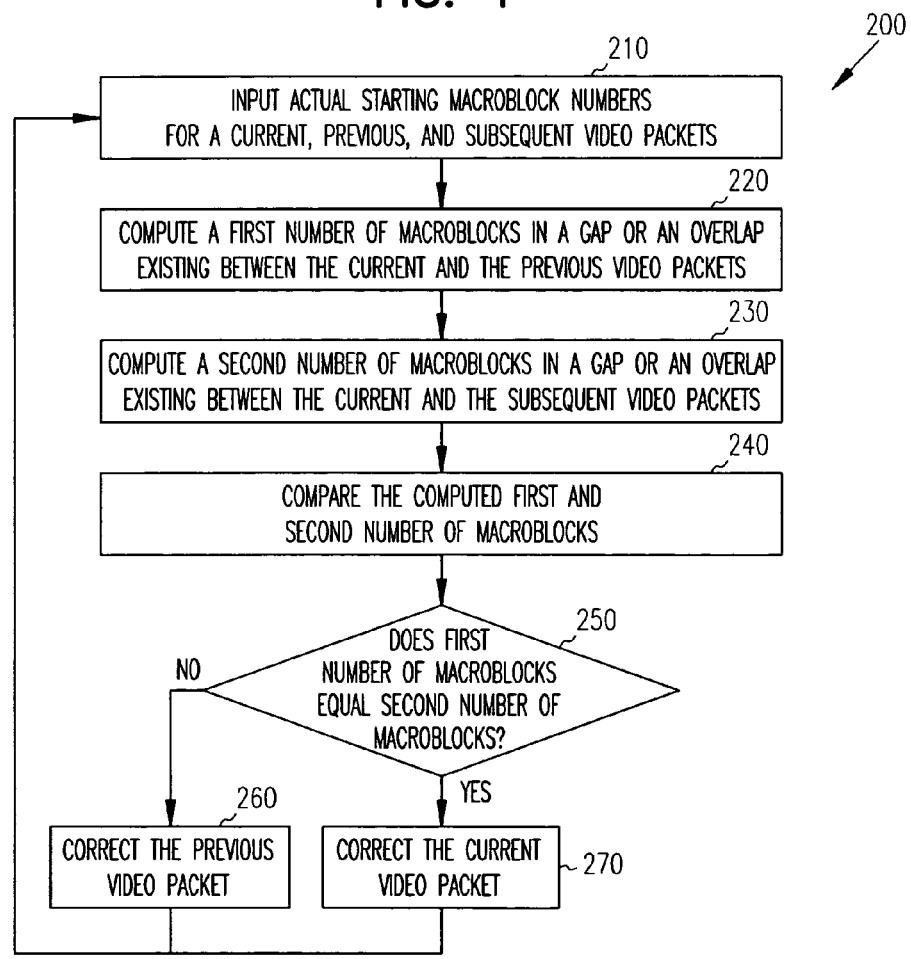
FIG. 2 is a flowchart illustrating an example error recovery technique.

FIG. 2 is a flowchart illustrating an example embodiment of an error recovery method 200 that analyzes boundaries of previous, current, and subsequent video packets P1, P2, and P3 (shown in FIG. 3) to detect and correct any channel errors found in a video frame. At 210, the method 200 in this example embodiment inputs actual starting macroblock numbers S1, S2, and S3 of a previous, current, and subsequent video packets P1, P2, and P3 shown in block diagram 300 of FIG. 3.

Figure 3:
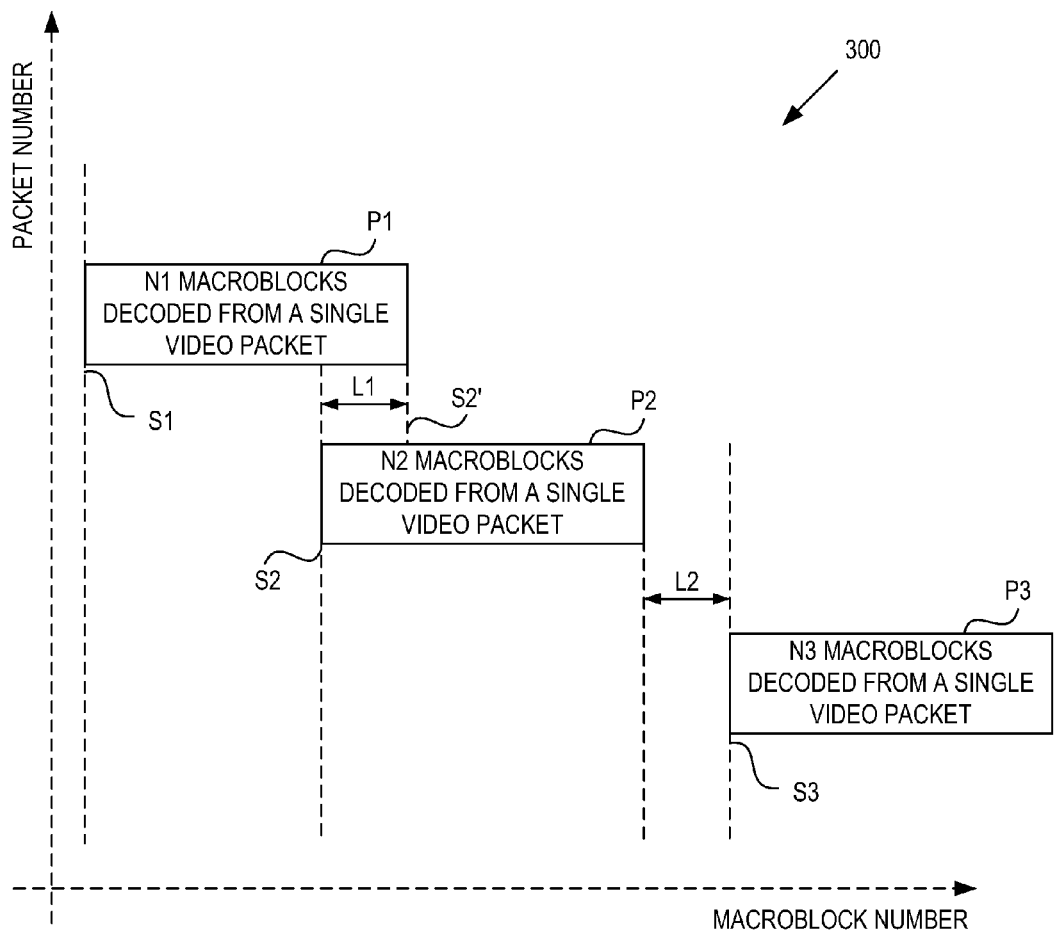
FIG. 3 is a block diagram illustrating the error recovery technique of FIG. 2.

As shown in FIG. 3, it can be seen that due to a channel error, the decoder may be inclined to use the start of the current video packet P2 as the macroblock number S2' instead of the actual macroblock start number S2 indicated in the current video packet P2. Also shown in FIG. 3 are macroblock regions L1 and L2 (i.e, gaps and overlaps), between the current and previous video packets P1 and P2 and between the current and subsequent video packets P2 and P3, respectively, resulting due to a channel error. Current macroblock here refers to a macroblock that is undergoing a process of error detection and does not refer to a macroblock undergoing decoding. These channel errors are undetected errors and are not detected during the decoding process. These channel errors are detected by obtaining differences in macroblock start numbers as maintained internally by a decoder and as indicated in a video packet header.

At 220, a first number of macroblocks in the macroblock region L1 (shown in FIG. 3) between the current and previous video packets P1 and P2 is computed. At 230, a second number of macroblocks in the macroblock region L2 (shown in FIG. 3) between the current and subsequent video packets P2 and P3 is computed. At 240, the computed first and second number of marcoblock in the macroblock regions L1 and L2 (shown in FIG. 3), respectively, are compared.

At 250, the computed first and second number of macroblocks in the macroblock regions L1 and L2 (shown in FIG. 3) are checked. If the first and second number of macroblocks in the macroblock regions L1 and L2 (shown in FIG. 3) are equal, i.e., contains the same number of macroblocks, then it is determined that the current video packet P2 has an error in the macroblock starting number and the starting macroblock number in the current video packet P2 is corrected at 270 to include the corrected starting macroblock number S2' (shown in FIG. 3). If the first and second macroblocks in the macroblock regions L1 and L2 (shown in FIG. 3) are not equal, then the previous video packet P1 (shown in FIG. 3) is corrected at 260. The correction here is done in the macroblock region L1 of the video packet P1. This process is recursively used for subsequent video packets where the 'current' video packet becomes 'previous' and 'subsequent' becomes 'current' and the new video packet is called 'subsequent'.

Figure 4:
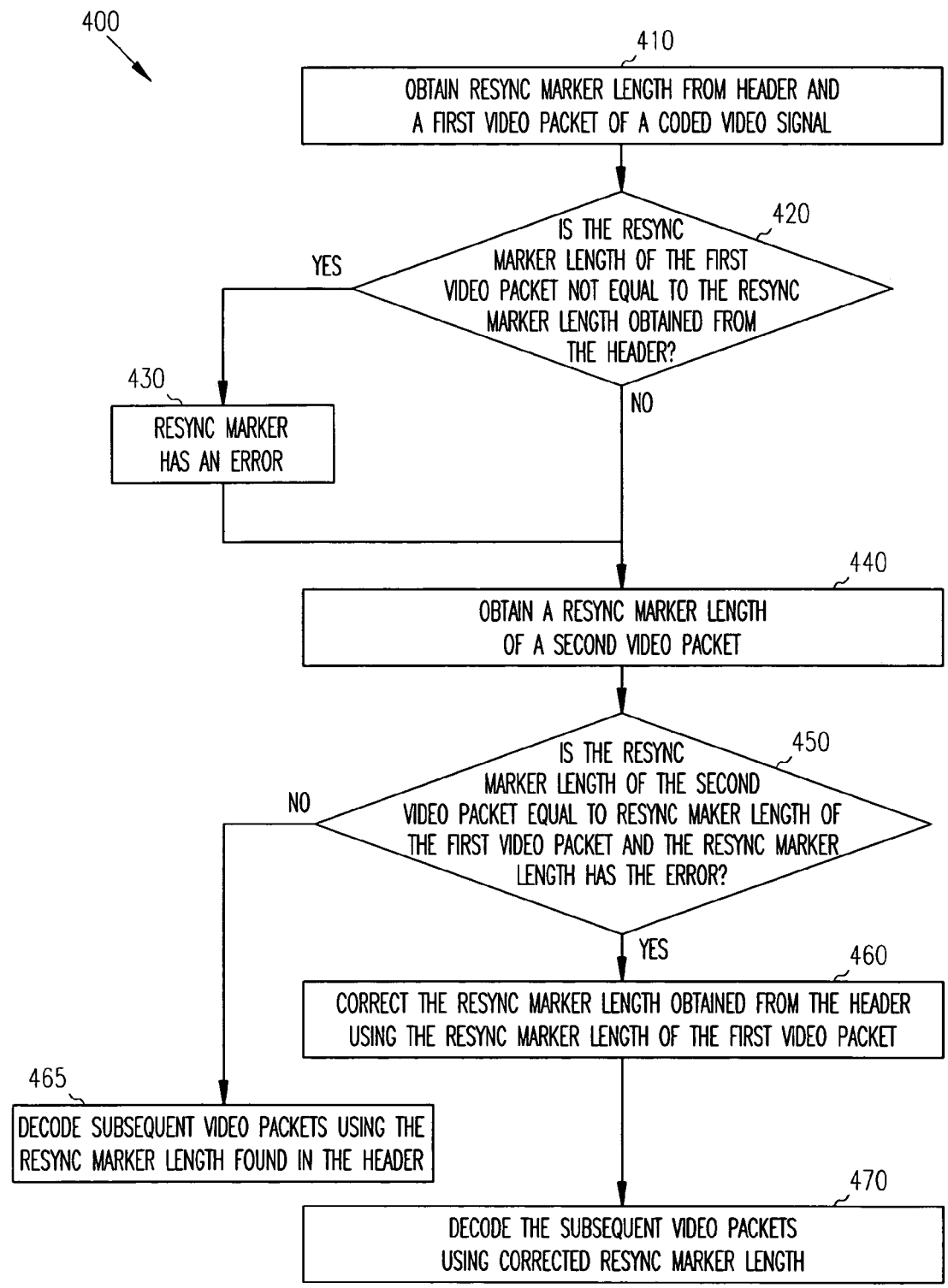
FIG. 4 is a flowchart illustrating another example error recovery technique.

Referring now to FIG. 4, there is illustrated a flowchart of an example embodiment of another error recovery method 400 according to the present subject matter. In an MPEG-4 coded video stream, the resync marker occurring at the end of each video packet can have a varying length based on parameters, such as "vop_fcode_forward" and "vop_fcode_backward" sent in the header at the start of each video frame. If these parameters are in error, the decoder can be misled to search for a resynchronization marker pattern that may not be present in the bit stream. The method 400 describes a technique to overcome the error in these parameters. At 410, the method 400 in this example embodiment obtains resynchronization (resync) marker lengths of a header of a video frame and a first video packet.

At 420, the resync marker lengths of the header of the video frame and the first video packet are checked for resync marker lengths. If the resync marker length in the header is equal to the resync marker length in the first video packet, a resync marker length of a second video packet is obtained at 440. If the resync marker length of the header is not equal to the resync marker length of the first video packet, it is determined, at 430, that the resync marker has an error.

At 450, the resync marker lengths of the first and second video packets are checked. If the resync marker length of the second video packet is equal to the resync marker length of the first video packet, and further, if at 430 it was determined that the resync marker has an error, then the resync marker length of the header is corrected using the resync marker length of the first video packet at 460. The subsequent video packets are then decoded using the corrected resync marker length at 470. If the resync marker length of the second video packet is not equal to the resync marker length of the first video packet, and further if, at 430, it was not determined that the resync marker has an error, the subsequent video packets are decoded using the resync marker length found in the header at 465.

Figure 5:
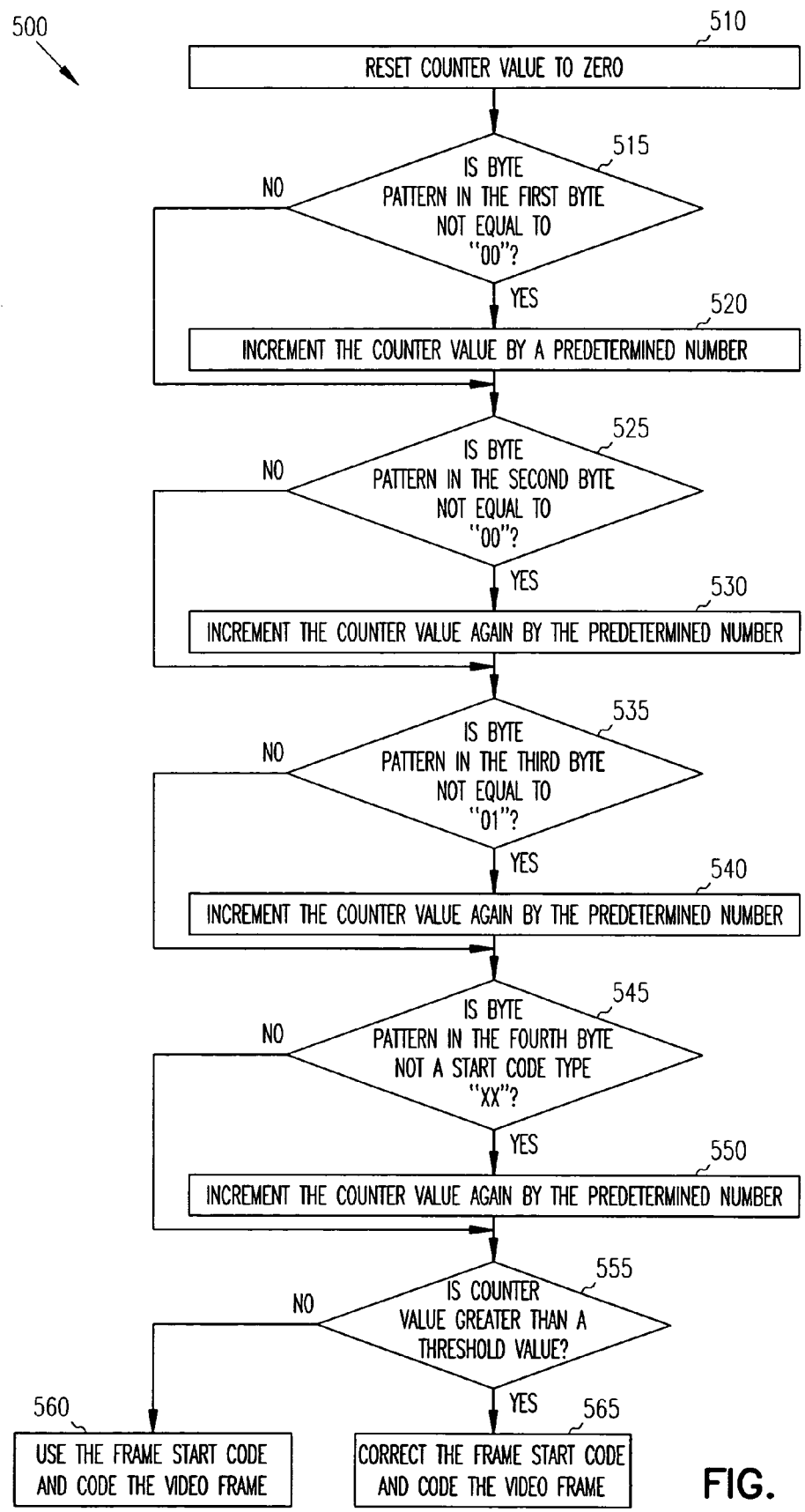
FIG. 5 is a flowchart illustrating yet another example error recovery technique.

Referring now to FIG. 5, there is illustrated a flowchart of an example embodiment of another error recovery method 500 according to the present subject matter. At 510, the method 500 in this example embodiment resets a counter value to zero. In this example embodiment, the error recovery is accomplished by analyzing byte patterns in a frame start code of a video frame to detect and recover from damaged video frame start codes. In this embodiment, bytes and the byte pattern used in the frame start code are similar to what is recommended in the MPEG-4 standard to demonstrate the detection and error recovery technique employed in the method 500. Therefore in this embodiment, bytes in the frame start code have first, second, third, and fourth bytes. Further, the byte pattern used in the first byte begins with "00" and ends with a byte pattern of "XX" in the fourth byte as recommended in the MPEG-4 standard.

At 520, the byte pattern of the first byte is checked. If the byte pattern in the first byte is not equal to "00", the counter value is incremented by a predetermined number at 520. At 530, the byte pattern of the second byte is checked. If the byte pattern of the second byte is not equal to "00", the counter value is again incremented by the predetermined number at 530. At 535, the byte pattern of the third byte is checked. If the byte pattern of the third byte is not equal to "01", the counter value is again incremented by the predetermined number at 540. At 545, the byte pattern of the fourth byte is checked. If the byte pattern of the fourth byte is not equal to "XX", the counter value is again incremented by the predetermined number at 550. At 555, the counter value is compared to a threshold value. If the counter value is greater than the threshold value, the frame start code of the current video frame is corrected and the current video frame is decoded at 565. If the counter value is not greater than the threshold value, the same frame start code obtained from the coded video frame is used to decode the current video frame at 560.

Figure 6:
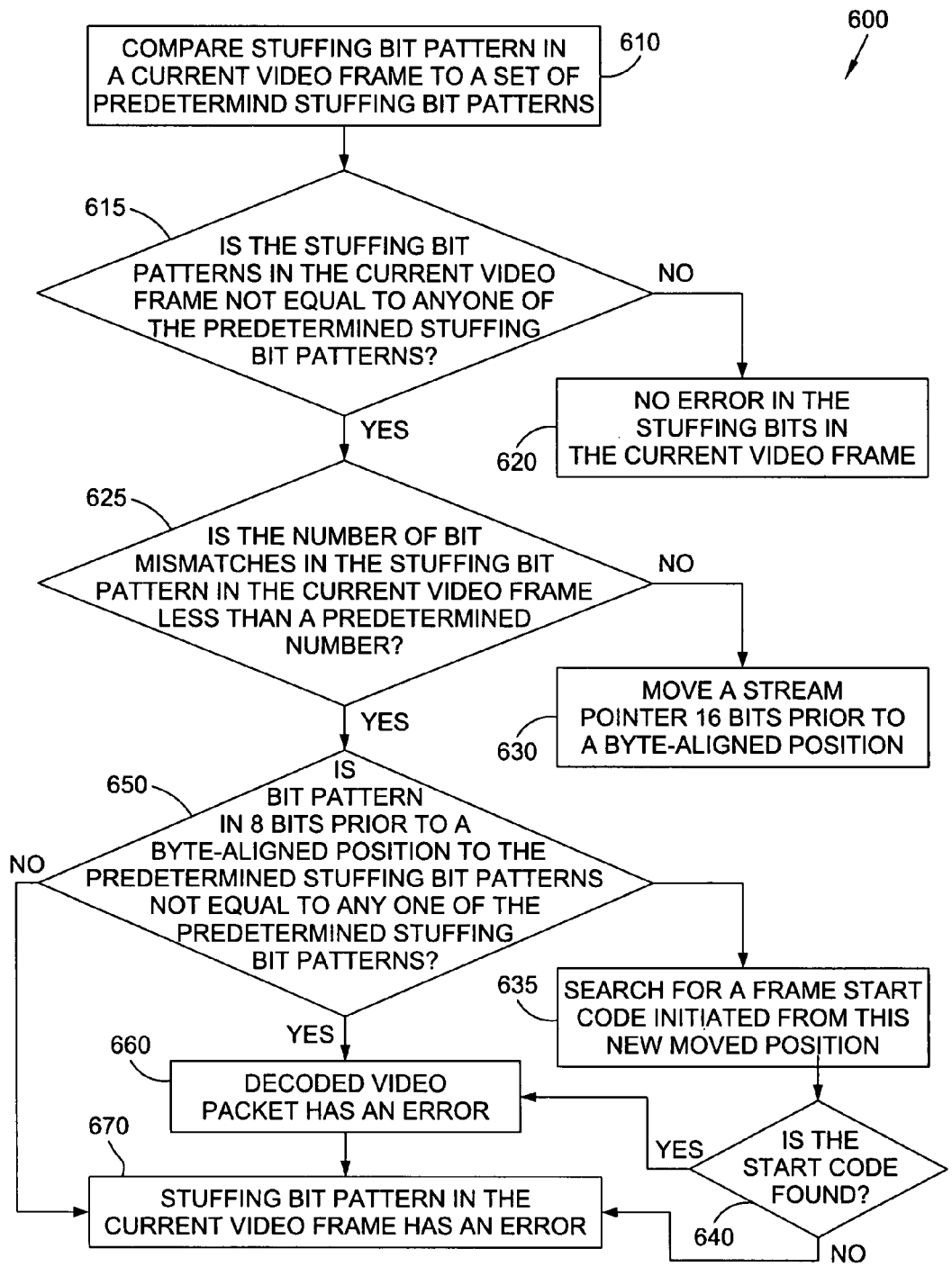
FIG. 6 is a flowchart illustrating yet another example error recovery technique.

Referring now to FIG. 6, there is illustrated a flowchart of an example embodiment of another error recovery method 600 according to the present subject matter. In this example embodiment, the error recovery is accomplished by analyzing stuffing bit pattern in a video frame. In this embodiment, MPEG-4 recommended number of stuffing bits and stuffing bit pattern are used to demonstrate the detection and error recovery technique employed in the method 600. Therefore, the MPEG-4 recommended stuffing bits range of 0<n<8 and the stuffing bit patterns having a predetermined set of stuffing bit patterns, such as 0, 01, 011, 0111, 01111, 011111, 0111111, and 01111111 are used in this method 600.

At 610, the method 600 in this example embodiment compares stuffing bit pattern in a current video frame to the predetermined set of stuffing bit patterns. At 615, stuffing bit pattern in the current video frame is checked to see if it is equal to any one of the predetermined set of stuffing bit patterns. If the stuffing bit pattern in the current video frame is equal to any one of the predetermined stuffing bit patterns, it is determined that there is no error in the stuffing bits in the current video at 620.

If the stuffing bit pattern in the current video frame is not equal to any one of the predetermined stuffing bit patterns, the number of bit mismatches in the stuffing bit pattern in the current video frame is checked to see whether it is less than a predetermined number at 625. If the number of bit mismatches in the stuffing bit pattern in the current video frame is not less than the predetermined number, stream pointer is moved 16 bits prior to a byte aligned position at 630 and the search for a frame start code is initiated from this new moved position at 635. At 640, stuffing bits are checked from this new moved position to see whether the frame start code was found. If the frame start code was found at 640, then it is determined that the decoded packet has an error at 660. If the frame start code was not found at 640, then it is determined that stuffing bit pattern in the current video frame has an error at 670.

If the number of bit mismatches in the stuffing bit pattern in the current video frame is less than the predetermined number, at 650, a stream pointer is moved 8 bits prior to the byte-aligned position and the search for the predetermined stuffing bit patterns is initiated from this new position. If the bit pattern in 8 bits prior to the byte-aligned position to the predetermined stuffing bit patterns is not equal to any one of the predetermined stuffing bit patterns, then it is determined that the decoded video packet has an error at 660.

Although the above methods 200, 400, 500, and 600 include blocks that are arranged serially in the exemplary embodiments, other embodiments of the present subject matter may execute two or more blocks in parallel, using multiple processors or a single processor organized two or more virtual machines or sub-processors. Moreover, still other embodiments may implement the blocks as two or more specific interconnected hardware modules with related control and data signals communicated between and through the modules, or as portions of an application-specific integrated circuit. Thus, the above exemplary process flow diagrams are applicable to software, firmware, and/or hardware implementations.

Figure 7:
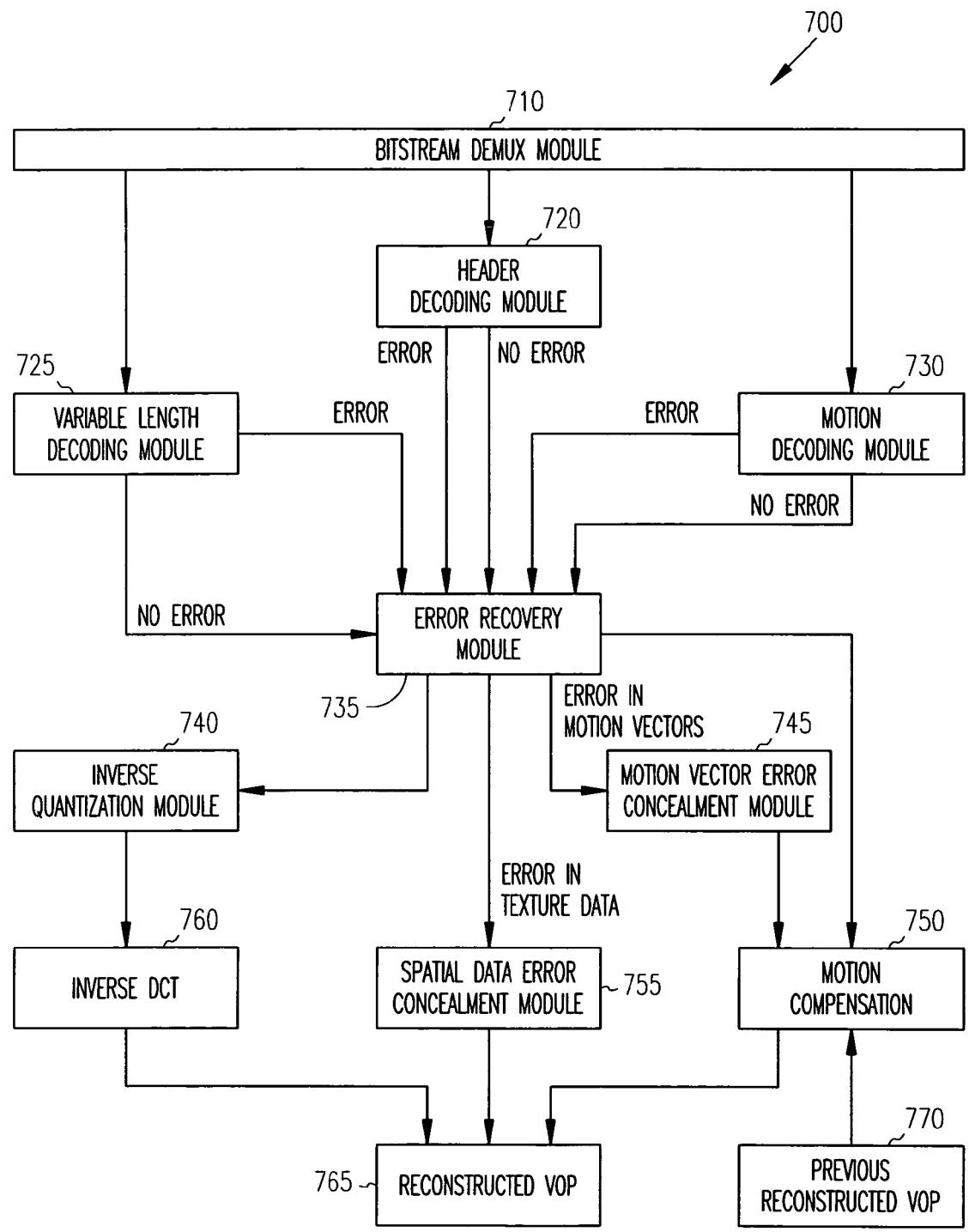
FIG. 7 is a block diagram illustrating an example decoder including an error recovery module for implementing embodiments of the present invention, such as those shown in FIGS. 2-6.

Referring now to FIG. 7, there is illustrated an example embodiment of a decoder 700 according to the present subject matter. The decoder includes a bit stream demux module 710, a header decoding module 720, a variable length decoding module 725, a motion decoding module 730, an error recovery module 735, an inverse quantization module 740, a motion vector error concealment module 745, a motion compensation module 750, a spatial data error concealment module 755, an inverse DCT module 760, a reconstructed VOP module 765, and a previous reconstructed VOP module 770.

In operation, in one example embodiment, the bit stream demux module 710 receives encoded video signal in the form of a sequence of coded MPEG-4 video frames. Each video frame includes a frame start code, one or more video packets following the start code, header and global information, and a stuffing bit pattern following the one or more video packets. Each video packet comprises a resync marker data, a macroblock number, motion and header information, and one or more macroblocks. The bit stream demux module 710 parses the received video signal to obtain the one or more coded video frames. The header decoding module 720 parses each video frame to get the header and global information, the resync marker data, and the stuffing bit pattern. In one embodiment, the error recovery module 735 detects and recovers from an error by localizing the error to a few macroblocks in the coded video frame based on analyzing the obtained header and global information.

In another embodiment, the error recovery module 735 analyzes boundaries of current, preceding, and subsequent video packets for a number of macroblocks present in gaps and/or overlaps between the current, preceding, and subsequent video packets. The error recovery module 735 then detects error location based on the outcome of the analysis of the boundaries of the current, preceding, and subsequent video packets. The error recovery module 735, then recovers from the error by limiting propagation of the error substantially to the error location by using the detected error location.

In some embodiments, the error recovery module 735 analyzes the boundaries of the current and preceding video packets and computes a first number of macroblocks in a gap or an overlap existing between the boundaries of the current and preceding video packets to detect the error and to isolate the propagation of the error to substantially few macroblocks in a video packet. The error recovery module 735 further computes a second number of macroblocks in a gap or an overlap existing between the boundaries the current and subsequent video packets. The error recovery module 735 then compares the computed first and second number of macroblocks. The error recovery module 735 then corrects the current video packet, if the first number of macroblocks is equal to the second number of macroblocks to localize the found error to a few macroblocks to the current video packet. The error recovery module 735 corrects the previous video packet, if the first number of macroblocks is not equal to the second number of macroblocks to localize the found error to a few macroblocks in the previous video packet.

In another embodiment, the error recovery module 735 analyzes the resync marker lengths of the header and first and second video packets of a video frame to detect the error and to limit the error propagation substantially to the error location. In these embodiments, the error recovery module 735 obtains the resync marker lengths of the header and first and second video packets of a video frame. The error recovery module 735 checks for error in resync marker, if the resync marker length of the first video packet is not equal to the resync marker length obtained from the header. The error recover module further obtains a resync marker length of a second video packet in the video frame. The error recovery module 735 then corrects the header resync marker length using the resync marker length of the first video packet and decodes the video frame using the corrected resync marker length found in the header, if the resync marker length of the second video packet is equal to the resync marker length of the first video packet and if the resync marker length has the error. The error recovery module 735 decodes the video frame using the resync marker length found in the header when the resync marker length of the second video packet is not equal to the resync marker length of the first video packet and if the resync marker length does not have the error.

In yet another embodiment, the error recovery module analyzes a frame start code to detect the error and to limit the error propagation substantially to the error location. The frame start code includes first, second, third, and fourth bytes. In one embodiment, the byte pattern in the first byte starts with a byte pattern "00" and ends with a byte pattern "XX". In these embodiments, the error recovery module 735 resets a counter value to zero. The error recovery module 735 increments the counter value by a predetermined number, if the byte pattern in the second byte is not equal to "00". The error recovery module 735 further increments the counter value with the predetermined number, if the byte pattern in the second byte is not equal to "00". The error recovery module 735 further increments the counter value with the predetermined number, if the third byte pattern is not equal to "01". The error recovery module 735 further increments the counter value with the predetermined number, if the fourth byte pattern is not equal to a predetermined frame start code type pattern, such as a "XXXX XXXX" pattern. The error recovery module 735 then corrects the frame start code when the counter value is greater than or equal to a threshold value. The operation of the error recovery module 735 in this embodiment is described-above in more detail with reference to FIG. 5.

In yet another embodiment, the error recovery module analyzes stuffing bit pattern in a current video frame to detect the error and to substantially limit the error propagation to the error location. In one embodiment, the error recovery module 735 compares the stuffing bit pattern in the current video frame to a predetermined number of standard stuffing bit patterns. The error recovery module 735 then counts a number of bit mismatches in the stuffing bit pattern in the current video frame, if the stuffing bit pattern in the current video frame is not equal to any one of the predetermined number of standard stuffing bit patterns. The error recovery module 735 further compares the bit pattern in the bits in the predetermined range prior to a byte aligned position to the predetermined number of standard stuffing bit patterns. The error recovery module 735 then corrects the stuffing bit pattern in the current video frame, if the bit pattern in the bits in the predetermined range prior to the byte aligned position is not equal to any one of the predetermined number of standard stuffing bit patterns. The error recovery module 735 moves a second predetermined number of bit mismatches and then searches for a frame start code from this new position, if the number of bit mismatches in the stuffing bit pattern in the current video frame is not less than a predetermined number. The error recovery module 735 then corrects the video packet, if the frame start code is found in the new position.

Various embodiments of the present invention can be implemented in software, which may be run in the environment shown in FIG. 8 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants of all types), laptop devices, multi-processors, microprocessors, set-top boxes, programmable consumer electronics, minicomputers, mainframe computers, and the like to execute code stored on a computer-readable medium.

Figure 8:
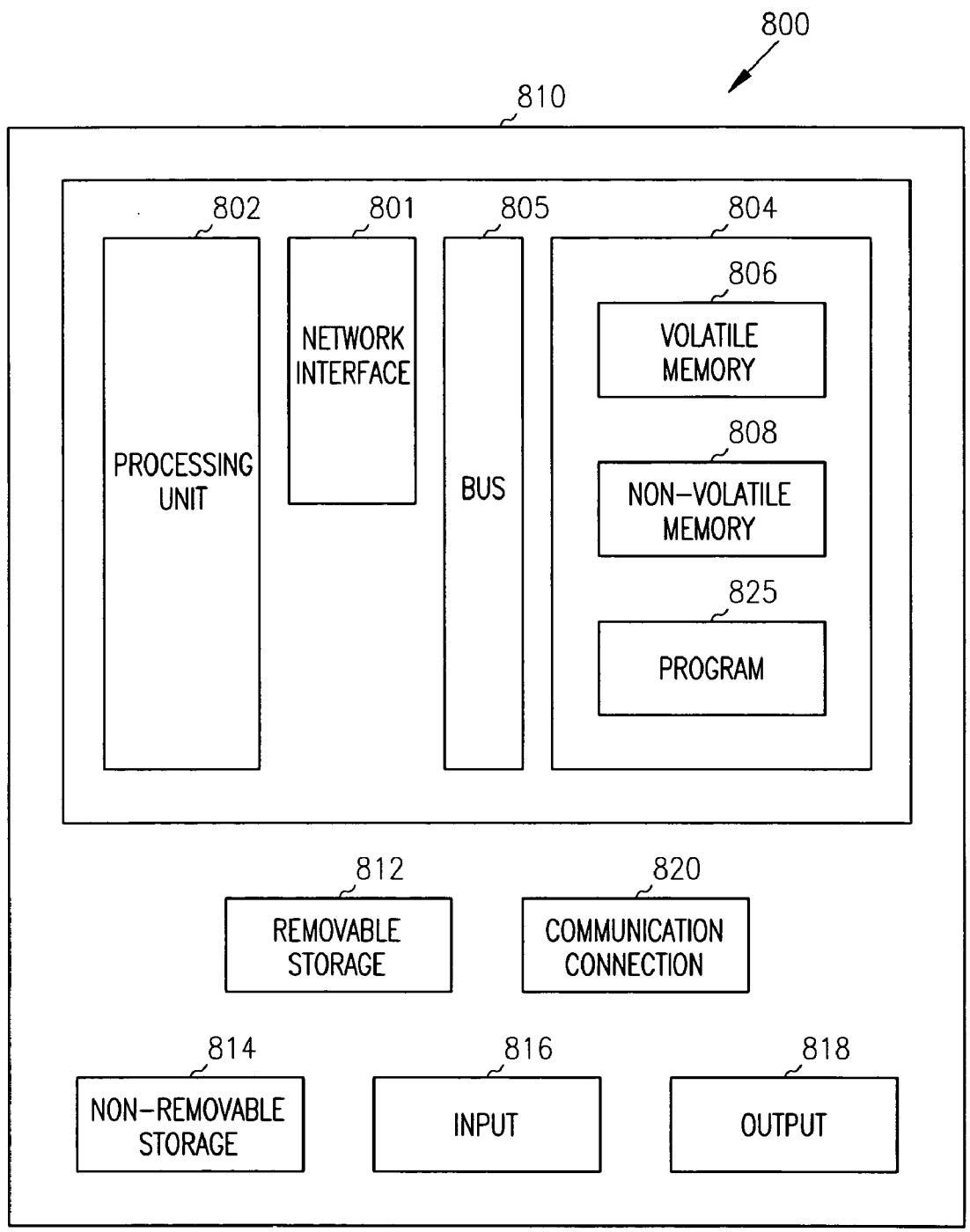
FIG. 8 is an example of a suitable computing environment for implementing embodiments of the present invention.

FIG. 8 shows an example of a suitable computing system environment for implementing embodiments of the present invention. FIG. 8 and the following discussion are intended to provide a brief, general description of a suitable computing environment in which certain embodiments of the inventive concepts contained herein may be implemented.

A general computing device, in the form of a computer 810, may include a processing unit 802, memory 804, removable storage 812, and non-removable storage 814. Computer 810 additionally includes a bus 805 and a network interface (NI) 801.

Computer 810 may include or have access to a computing environment that includes one or more input elements 816, one or more output elements 818, and one or more communication connections 820 such as a network interface card or a USB connection. The computer 810 may operate in a networked environment using the communication connection 820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 804 may include volatile memory 806 and non-volatile memory 808. A variety of computer-readable media may be stored in and accessed from the memory elements of computer 810, such as volatile memory 806 and non-volatile memory 808, removable storage 812 and non-removable storage 814.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 802 of the computer 810. For example, a computer program 825 may comprise machine-readable instructions capable of detecting and correcting the channel errors in transmitted encoded video signals according to the teachings and herein described embodiments of the present invention. In one embodiment, the computer program 825 may be included on a CD-ROM and loaded from the CD-ROM to a hard drive in non-volatile memory 808. The machine-readable instructions cause the computer 810 to detect and correct channel errors in a video frame according to the embodiments of the present invention.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A method comprising:
    parsing a coded video signal to obtain one or more video frames by a video decoder, wherein each video frame includes header and global information, wherein the header and global information in each video frame includes a frame start code, one or more video packets following the frame start code, and a stuffing bit pattern following the one or more video packets, wherein each video packet comprises a resync marker data, a macroblock number, motion and header information, and one or more macroblocks including associated macroblock data;
    detecting an error in each video frame by analyzing the header and global information in the video frame by the video decoder; and
    correcting the video frame using the detected error to recover from the error by substantially limiting propagation of the error in the video frame by using the analyzed header and global information by the video decoder, wherein analyzing the header and global information includes performing an analysis of boundaries of current, preceding, and subsequent video packets for a macroblock number error from gaps and/or overlaps between the current, preceding, and subsequent video packets.

2. The method of claim 1, wherein analyzing the video packet boundaries of the current, preceding, and subsequent video packets for the macroblock number error from the gaps and overlaps comprises:
    computing a first macroblock number error for a gap or an overlap existing between the current video packet and a previous video packet;
    computing a second macroblock number error for a gap or an overlap existing between the current video packet and the subsequent video packet;
    comparing the computed first and second number of macroblocks;
    if the first number of macroblocks is equal to the second number of macroblocks, then correcting the current video packet;
    if the first number of macroblocks is not equal to the second number of macroblocks, then correcting the previous video packet; and
    repeating the above steps for a next current video packet in the received coded video signal.

3. An apparatus comprising:
    a bit stream demux module to receive a coded video signal, wherein the coded video signal comprises a sequence of video frames, wherein each video frame includes a frame start code, one or more video packets following the frame start code, motion information, header and global information, and a stuffing bit pattern following the one or more video packets, wherein each video packet comprises a resync marker data, a macroblock number, and one or more macroblocks including associated macroblock data;
    a header decoding module to parse the coded video signal to get header and global information; and
    an error recovery module to detect and recover from an error in the coded video signal based on analyzing the header and global information in the coded video signal, wherein analyzing the header and global information includes performing an analysis of boundaries of current, preceding, and subsequent video packets for a decoded macroblock number error from gaps and/or overlaps between the current, preceding, and subsequent video packets.

4. The apparatus of claim 3, wherein the error recovery module analyses the boundaries of the current, preceding, and subsequent video packets by computing a first macroblock number error for a gap or an overlap between the boundaries of the current and preceding video packets, wherein the error recovery module further computes a second macroblock number error for a gap or overlap between the boundaries of current and subsequent video packets, wherein the error recovery module compares the computed first and second number of macroblocks, wherein the error recovery module corrects the current video packet when the first number of macroblocks is equal to the second number of macroblocks, and wherein the error recovery module corrects the previous video packet when the first number of macroblocks is not equal to the second number of macroblocks.

5. An apparatus for decoding a coded video signal, comprising:
- means for receiving a video signal including a sequence of video frames, wherein each video frame includes a frame start code, one or more video packets following the frame start code, and a stuffing bit pattern following the one or more video packets, wherein each video packet comprises a resync marker data, a macroblock number, motion and header information, and one or more macroblocks including associated macroblock data;
- means for extracting header and global information, resync marker length, bit patterns in a frame start code, and stuffing bit pattern; and
- means for detecting and recovering from an error in the coded video signal, wherein the means for detecting and recovering from an error analyzes based on techniques selected from the group consisting of, performing an analysis of boundaries of a current video packet, a preceding video packet, and a subsequent video packet for a macroblock number error from gaps and overlaps between the current video packet, the previous video packet, and the subsequent video packet, and
- analyzing resync marker lengths in a header of a video frame and in first and second video packets.

6. A computer readable medium encoded with stored instructions that, when executed by a computer, result in execution of a method comprising:
- receiving a coded video signal, wherein the coded video signal comprises a sequence of video frames, wherein each video frame includes a frame start code, one or more video packets following the frame start code, and a stuffing bit pattern following the one or more video packets, wherein each video packet comprises a resync marker data, a macroblock number, motion and header information, and one or more macroblocks including associated macroblock data;
- detecting an error location in a coded video signal by analyzing data in the coded video signal; and
- recovering from the error by limiting propagation of the error substantially to the error location by using the analyzed data, wherein analyzing the data in the coded video signal comprises techniques selected from the group consisting of,
  - performing an analysis of boundaries of a current video packet, a preceding video packet, and a subsequent video packet for a macroblock number error for gaps and overlaps between the current video packet, the previous video packet, and the subsequent video packet, and
  - analyzing resync marker lengths in a header of a video frame and in first and second video packets.

7. A system comprising:
- a bus;
- a processor coupled to the bus;
- a memory coupled to the processor;
- a network interface coupled to the processor and the memory; and
- a video decoder coupled to the network interface comprising:
  - a bit stream demux module to receive a coded video signal, wherein the coded video signal comprises a sequence of video frames, wherein each video frame includes a frame start code, one or more video packets following the frame start code, and a stuffing bit pattern following the one or more video packets, wherein each video packet comprises a resync marker data, a macroblock number, motion and header information, and one or more macroblocks including associated macroblock data; and
  - an error recovery module to analyze data in the coded video signal and to detect and recover from an error by limiting propagation of the error substantially to the error location using the analyzed data, wherein the error recovery module analyzes the data based on techniques selected from the group consisting of,
  - performing an analysis of boundaries of a current video packet, a preceding video packet, and a subsequent video packet for a macroblock number error from gaps and overlaps existing between the current video packet and the previous video packet and between the current video packet and the subsequent video packet, and
  - analyzing resync marker lengths in a header of a video frame and in first and second video packets.

* * * * *